(12) United States Patent
Hirukawa et al.

(10) Patent No.: US 8,348,006 B2
(45) Date of Patent: Jan. 8, 2013

(54) STRUCTURE FOR MOUNTING ANCILLARIES ON VEHICLE

(75) Inventors: Masayuki Hirukawa, Saitama (JP); Taeko Togawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 101 days.

(21) Appl. No.: 12/956,492

(22) Filed: Nov. 30, 2010

(65) Prior Publication Data

US 2011/0127401 A1    Jun. 2, 2011

(30) Foreign Application Priority Data

Dec. 2, 2009  (JP) ................................. 2009-274460

(51) Int. Cl.
*B62D 21/00*  (2006.01)
(52) U.S. Cl. ...................................................... 180/311
(58) Field of Classification Search .................. 280/311; 296/1.07, 37.1, 187.01; 248/300, 558, 674
See application file for complete search history.

(56) References Cited

U.S. PATENT DOCUMENTS

| 3,171,155 A | * | 3/1965 | Kibler ......................... 15/250.02 |
| 7,410,019 B2 | | 8/2008 | Kotrla |
| 2006/0113815 A1 | * | 6/2006 | Ohzono ....................... 296/37.1 |

FOREIGN PATENT DOCUMENTS

JP    2004-228399 A    8/2004

\* cited by examiner

*Primary Examiner* — Paul N Dickson
*Assistant Examiner* — Robert A Coker
(74) *Attorney, Agent, or Firm* — Birch, Stewart, Kolasch & Birch, LLP

(57) ABSTRACT

A structure for mounting ancillaries on a vehicle wherein one end of a first bracket in a plate form extends downwardly and is fixed to a body frame and the other end of the first bracket supports a reservoir. In addition, the first bracket supports the regulator in the proximity of the reservoir. The reservoir attached to the forward end of the first bracket functions as a deadweight which, because of the inertia of the deadweight, suppresses the vibrations of the forward end of the first bracket due to vehicle traveling and engine rotation. Thus, this structure suppresses and attenuates the vibration of the regulator attached to the first bracket.

20 Claims, 9 Drawing Sheets

STRUCTURE FOR MOUNTING ANCILLARIES ON VEHICLE

CROSS-REFERENCE TO RELATED APPLICATIONS

The present application claims priority under 35 USC 119 to Japanese Patent Application No. 2009-274460 filed on Dec. 2, 2009 the entire contents of which are hereby incorporated by reference.

BACKGROUND OF THE INVENTION

1. Field of the Invention

The present invention relates to a structure for mounting ancillaries which assist the operation of the power generating unit such as the internal combustion engine on a vehicle.

2. Description of Background Art

A vehicle may be provided with ancillaries to assist the operation of the power generating unit. For example, the cooling system of the internal combustion engine is provided with ancillaries such as a radiator and an oil cooler, including a hose and a reservoir associated therewith. Likewise, the electric system of the internal engine is provided with ancillaries such as a regulator and an ignition coil. These ancillaries are mounted on a vehicle in a specific way. For example, according to the Japanese Patent Laid-Open No. 2004-228399, the battery regulator is mounted in contact with the body frame in the case of a saddle ride-type vehicle.

However, the above-mentioned ancillaries mounted on a vehicle are subject to vibrations resulting from traveling or produced by the internal combustion engine and any other machines. Such vibrations are undesirable for such ancillaries as regulators which are composed of precision parts. Countermeasures against vibrations should be taken in consideration of production cost and vehicle weight. It is preferable to provide a simple structure for mounting the ancillaries at a low cost.

OBJECTS AND SUMMARY OF THE INVENTION

The present invention was completed in view of the foregoing. It is an object of an embodiment of the present invention to provide a simple structure for mounting ancillaries on a vehicle in such a way so as to suppress the vibrations of ancillaries.

As solving means of the problem described above, according to an embodiment of the present invention, a structure for mounting ancillaries on a vehicle having a body frame 2 is composed of a plurality of frame members (such as the front upper frames 7L and 7R in the embodiment), a power generating machine (such as the engine E in the embodiment) to generate power, and a plurality of ancillaries (such as the reservoir 30 in the embodiment) to assist the operation of the power generating machine, wherein the body frame is provided with a bracket in the form of a sheet or rod extending downward, the bracket (such as the first bracket in the embodiment) having one end thereof fixed to the body frame, the first of the ancillaries (such as the reservoir 30) being attached to the other end of the bracket, and the second of the ancillaries (such as the regulator 36 in the embodiment) being attached to the bracket in proximity of the first of the ancillaries.

According to an embodiment of the present invention, the first ancillary is a reservoir to store a liquid therein.

According to an embodiment of the present invention, the first ancillary has a first fixture 37 and a second fixture 38 having elastic properties, the first fixture is attached to the bracket, the second fixture is attached to a member different from a member to which is attached the bracket of the body frame, and the first ancillary is mounted on the body frame across the different members of the body frame.

According to an embodiment of the present invention, the first ancillary is a plastic tank and the first fixture and the second fixture are formed integrally with the plastic tank.

According to an embodiment of the present invention, the second fixture is formed so as to have a plurality of folded parts 38A and 38B.

According to an embodiment of the present invention, the first ancillary has an approximately triangular shape having an apex 30B as viewed from above, the second fixture is formed at the apex of the first ancillary, and the first ancillary is formed at the surface 30C opposite to the apex.

According to an embodiment of the present invention, the bracket is in the form of a sheet and is fixed to the body frame in such a way that its surface is along the axial direction of the driving axle (such as the propeller shaft 22 in the embodiment) or the axial direction of the crank shaft C.

According to an embodiment of the present invention, the second ancillary is electrical equipment.

According to an embodiment of the present invention, the first ancillary is one which is heavier than the second ancillary.

According to an embodiment of the present invention, the first ancillary attached to the forward end which is the other end of the bracket functions as a deadweight which, because of the inertia of the deadweight, suppresses the vibration of the forward end of the bracket due to vehicle traveling and engine rotation. Thus, this simple structure suppresses and attenuates the vibration of the second ancillary attached to the bracket.

According to an embodiment of the present invention, the first ancillary is capable of holding a liquid therein and the liquid held therein helps the first ancillary keep the position of the first ancillary owing to its inertia as it flows. This effectively suppresses the vibration of the first bracket and the second ancillary.

According to an embodiment of the present invention, the first ancillary is mounted such that it extends across different members of the body frame and fixed at two portions. Thus, the second fixture having the elastic properties suppresses and attenuates the vibrations of the bracket. This in turn effectively suppresses and attenuates the vibrations of the bracket and the second ancillary.

According to an embodiment of the present invention, the plastic tank which has elastic properties functions as a vibration damper and effectively suppresses and attenuates the vibrations of the bracket and the second ancillary.

According to an embodiment of the present invention, the second fixture has elastic properties and contributes to cost reduction despite its simple structure.

According to an embodiment of the present invention, the first ancillary absorbs vibrations only by the flexure of the surface while keeping its stiffness. Thus, it effectively suppresses and attenuates the vibration of the bracket and the second ancillary.

According to an embodiment of the present invention, the structure prevents the vehicle vibrations in the radial direction of the driving axles caused by the rotation of the driving axles from transmitting to the bracket. Hence it suppresses the vibrations of the bracket and the second ancillary.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The following is a description of the embodiment according to the present invention which is given with reference to the accompanying drawings.

Figure 1:
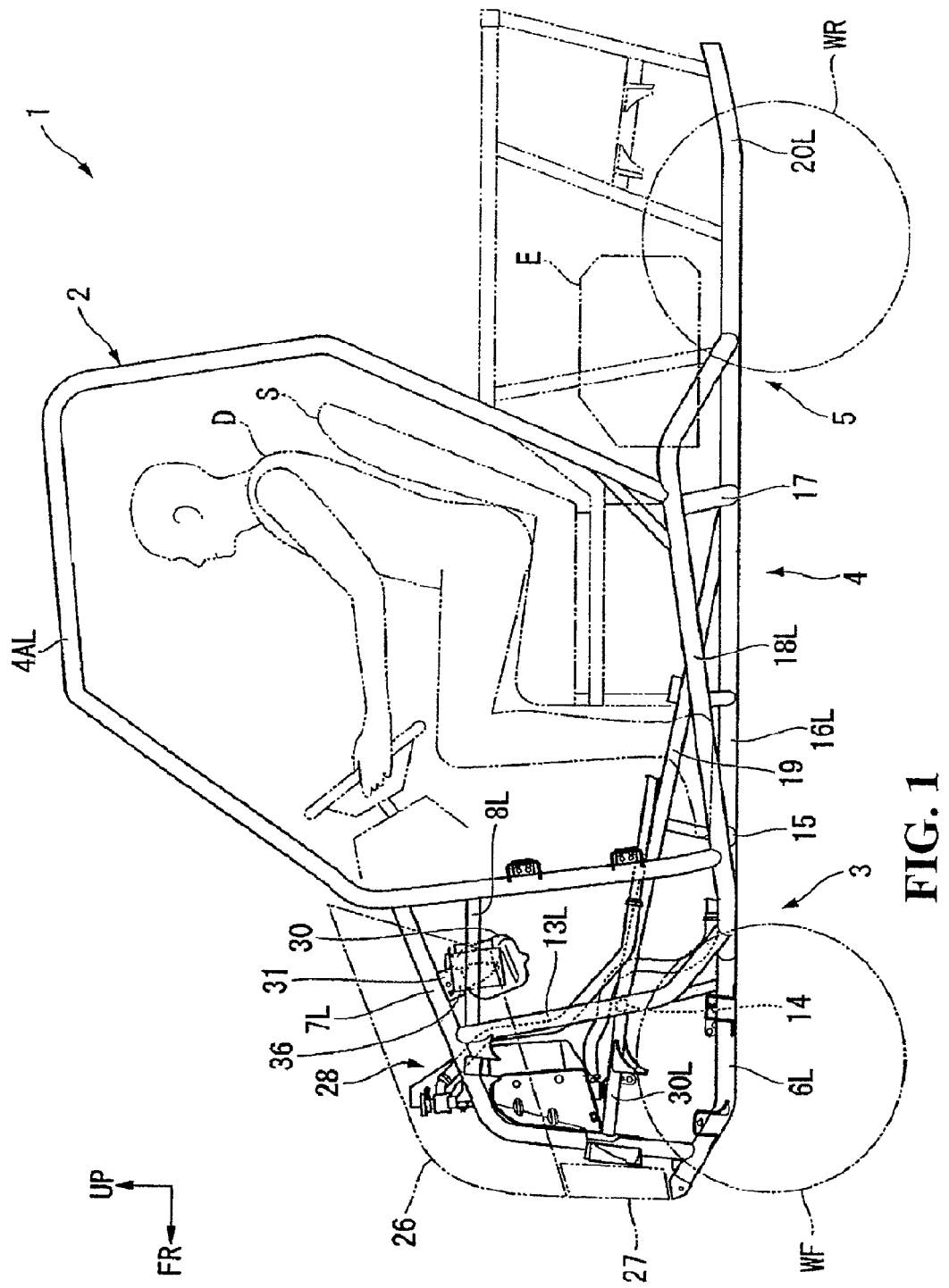
FIG. 1 is a side view of the vehicle pertaining to the embodiment of the present invention.
Figure 2:
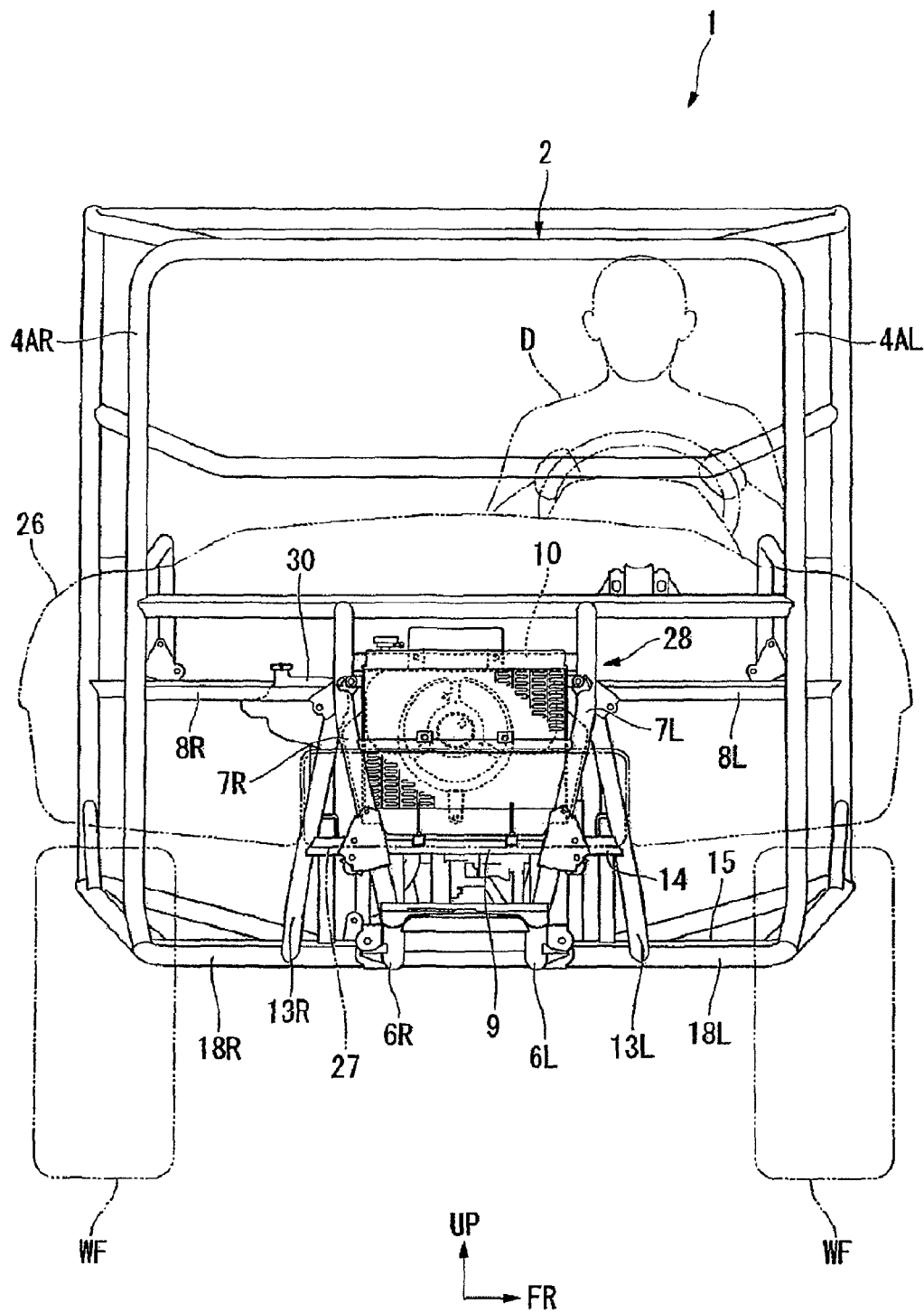
FIG. 2 is a front view of the vehicle pertaining to the embodiment of the present invention.
Figure 3:
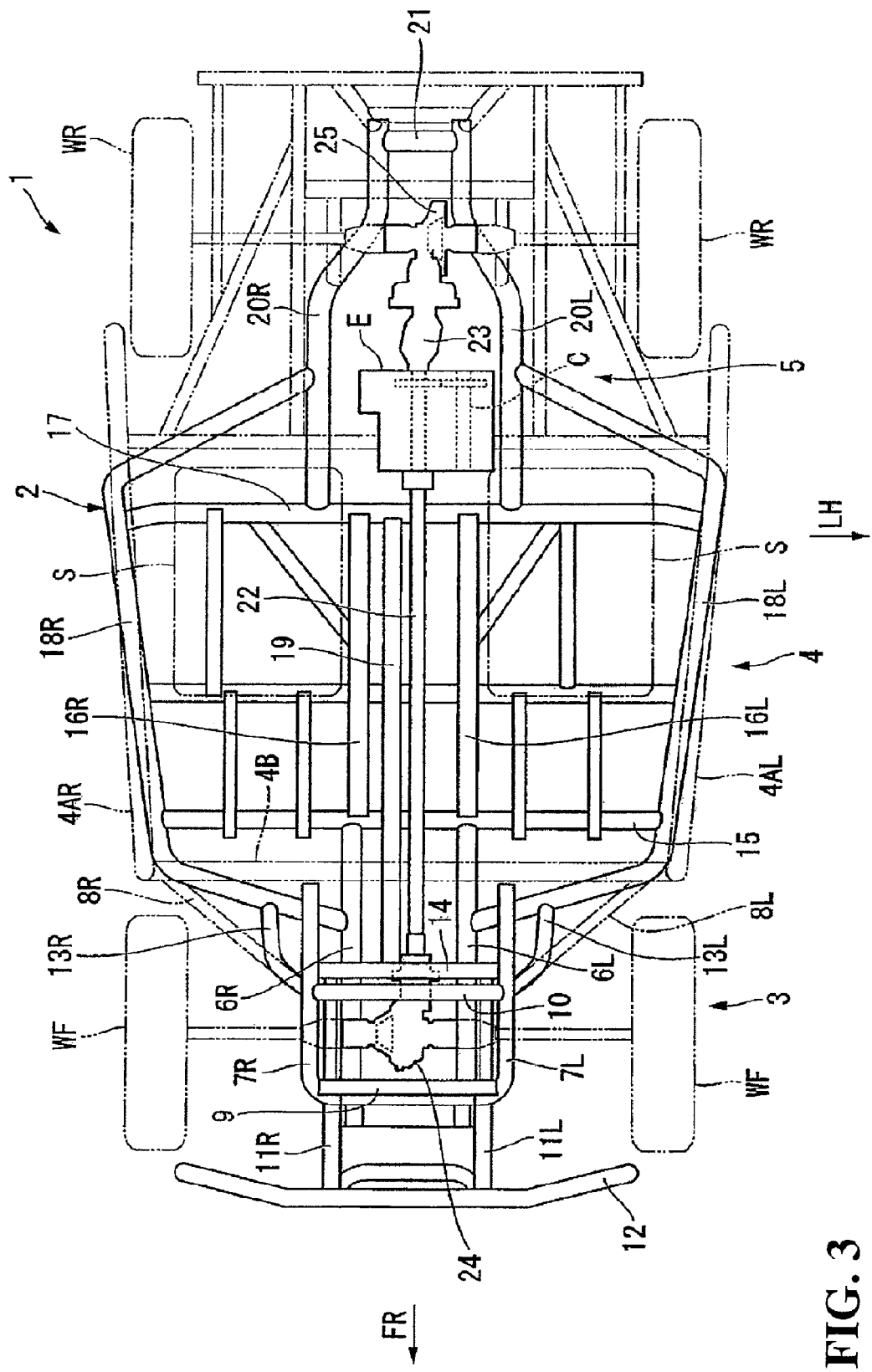
FIG. 3 is a top view of the vehicle pertaining to the embodiment of the present invention.
Figure 4:
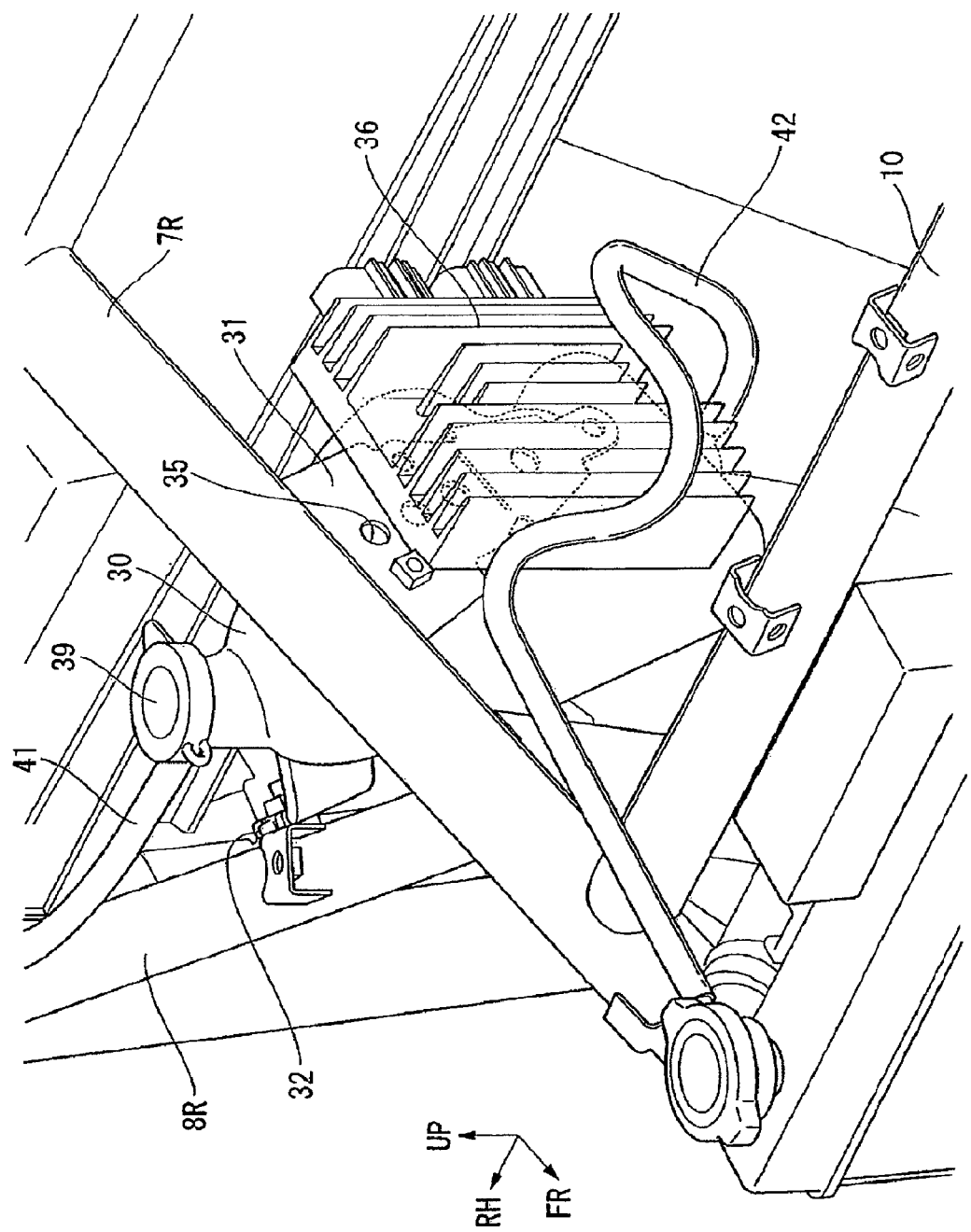
FIG. 4 is a perspective view of the surrounding of the reservoir.

FIGS. 1 to 3 are a side view, front view, and plan view, respectively, which schematically show the vehicle 1 which has the structure as defined in the present invention. Symbols used in the figures are defined as follows.

FR: the forward direction of the vehicle
LH: the leftward direction of the vehicle
RH: the rightward direction of the vehicle
UP: the upward direction of the vehicle These symbols will be used hereinafter to denote the directions of the vehicle. First, the structure of the vehicle 1 will be outlined with reference to FIGS. 1 to 3.

The vehicle 1 is a multi-utility vehicle (MUV) of comparatively small size which is designed mainly for traveling on a rough terrain. It has the body frame 2 which constitutes the basic skeleton of the vehicle. The body frame 2 includes the front frame 3 from which the front wheels WF are suspended, the center frame 4 which forms a space in which is arranged behind the front frame 3 the seat S for the driver D, and the rear frame 5 behind the center frame 4 on which the engine E is mounted and from which the rear wheels WR are suspended. In addition, the body frame 2 is constructed mainly of round pipes which are reinforced with sheet members in the horizontal, vertical, and oblique directions, as mentioned later.

The front frame 3 has the right-and-left paired front lower frames 6L and 6R, which extend forward and backward from the front lower part of the vehicle, and the right-and-left paired front upper frames 7L and 7R, which rise from the front end of the front arm frames 6L and 6R and then bend and extend backward and upward. Under the front upper frames 7L and 7R are arranged the first sub-cross frame 9, and above the front upper frames 7L and 7R are arranged the second sub-cross frame 10.

In front of the front lower frame 6L and 6R are arranged the right-and-left paired bumper-supporting frames 11L and 11R, and to the front end of the bumper-supporting frames 11L and 11R are fixed the bumper 12 which extends in the right and left directions (see FIG. 3. FIGS. 1 and 2 do not show the bumper and the bumper-supporting frames 11L and 11R). To the lower side of the upper part of the front upper frames 7L and 7R are connected the inverted frames 13L and 13R which extend downward. Between the inverted frames 13L and 13R is mounted the front sub-cross frame 14. To the side of the upper part of the front upper frames 7L and 7R are connected the side cross frame 8L which extends backward and leftward approximately horizontally and the side cross frame 8R which extends backward and rightward approximately horizontally.

The center frame 4 joins to the rear end of the front lower frames 6L and 6R. It also joins to the first lower cross frame 15 which extends in the widthwise direction of the vehicle, to the right-and-left paired central lower frames 16L and 16R which extend backward from approximately the central region of the first lower cross frame 15, and to the rear end of the central lower frames 16L and 16R. It also joins to the second lower cross frame 17 which extends in the widthwise direction of the vehicle and both ends of the first lower cross frame 15 and the second lower cross frame 17. Moreover, it has the right-and-left paired side frames 18L and 18R which extend in the forward and backward directions of the vehicle and the center frame 19 which is arranged between the first lower cross frame 15 and the second lower cross frame 17.

As shown in FIG. 3, the central lower frames 16L and 16R are arranged at positions a certain distance away from the vehicle center in the widthwise direction of the vehicle. They are equally away from the vehicle center in the right and left directions. The side frames 18L and 18R bend inward in the widthwise direction of the vehicle from the position at which the first lower cross arm 15 joins, and it has its front end joined to the front lower frames 6L and 6R of the front frame 3. In addition, the rear end of the side frames 18L and 18R bends inward in the widthwise direction of the vehicle from the position at which it joins to the second lower cross frame 17, and it joins to the rear frames 20L and 20R which will be mentioned later. Also, to the side frames 18L and 18R are joined the lower end of the inverted frames 13L and 13R mentioned above.

As shown in FIG. 1, to the front part and rear part of the side frames 18L and 18R are joined the ends of the U-shaped (as viewed sideward) roll bars 4AL and 4AR which form the space surrounding the driver's seat. As shown in FIG. 3, between the front parts of the roll bars 4AL and 4AR is arranged the center upper cross frame 4B. To the center upper cross frame 4B are joined the rear ends of the side cross frames 8L and 8R mentioned above, extending from the upper side of the front upper frames 7L and 7R.

The center frame 19 has its rear end joined to the approximately center region of the second lower cross arm 17, and it also extends in the forward direction of the vehicle and has its front end joined to the front sub-cross frame 14 of the front frame 3. In addition, the center frame 19 passes between the center lower frame 16R and the vehicle center across the vehicle width, and it also extends straight in the forward direction of the vehicle. In other words, the center frame 19 is arranged a certain distance away rightward from the vehicle center across the vehicle width.

The rear frame 5 has the right-and-left paired rear lower frames 20L and 20R which extend backward from the approximately center region of the second cross frame 17. It also has a plurality of cross frames not shown in FIG. 3 and attached to the rear lower frames 20L and 20R. The rear lower frames 20L and 20R bend in such a way that they come close as they extend backward and they finally join to the rear cross member 21 at their rear end.

The engine E is a water-cooled engine. It is mounted longitudinally above the rear lower frames 20L and 20R. As shown in FIG. 3, the engine E has the crankshaft C whose axis extends in the longitudinal direction of the vehicle. The engine E also has the crankcase not shown in FIG. 3 from which the front propeller shaft 22 to transmit driving power extends forward and the rear propeller shaft 23 extends backward (the front and rear propeller shafts are not shown in FIGS. 1 and 2).

The front propeller shaft 22 extends straight along the center line of the vehicle across the widthwise direction of the vehicle, and it joins to the front final assembly 24 mounted on the front frame 3. The rear propeller shaft 23, which is comparatively short, extends backward slightly offset leftward from the vehicle's center line and joins to the rear final assembly 25 mounted on the rear frame 5. The driving power of the engine E is transmitted to the front wheel WF from the front propeller shaft 22 via the front final assembly 24, and it is also transmitted to the rear wheel WR from the rear propeller shaft 23 via the rear final assembly 25.

As shown in FIGS. 1 and 2, above the front upper frames 7L and 7R in the front part of the vehicle is arranged the bonnet 26. In front of the front upper frames 7L and 7R is arranged the grille 27, which functions as the intake port. The bonnet 26 is supported at a proper portion of the front upper frames 7L and 7R, and it is designed to cover the entire width of the front upper frames 7L and 7R. The grille 27 is arranged below the front end of the bonnet 26 and at approximately the center in the widthwise direction of the vehicle. Below the bonnet 26 and behind the grille 27 is arranged the radiator 28, and behind the radiator 28 is arranged the reservoir 30 to store cooling water.

The following is a detailed description of the surrounding of the reservoir 30 shown in FIGS. 4 to 9.

The reservoir 30 is a plastic tank capable storing cooling water. As shown best in FIGS. 4 and 5, the reservoir 30 is mounted such that it extends across the front upper frame 7R and the side cross frame 8R. The reservoir 30 is fixed to the body by means of the first bracket 31 and the second bracket 32 which are formed on the front upper frame 7R and the side cross frame 8R, respectively.

Figure 6:
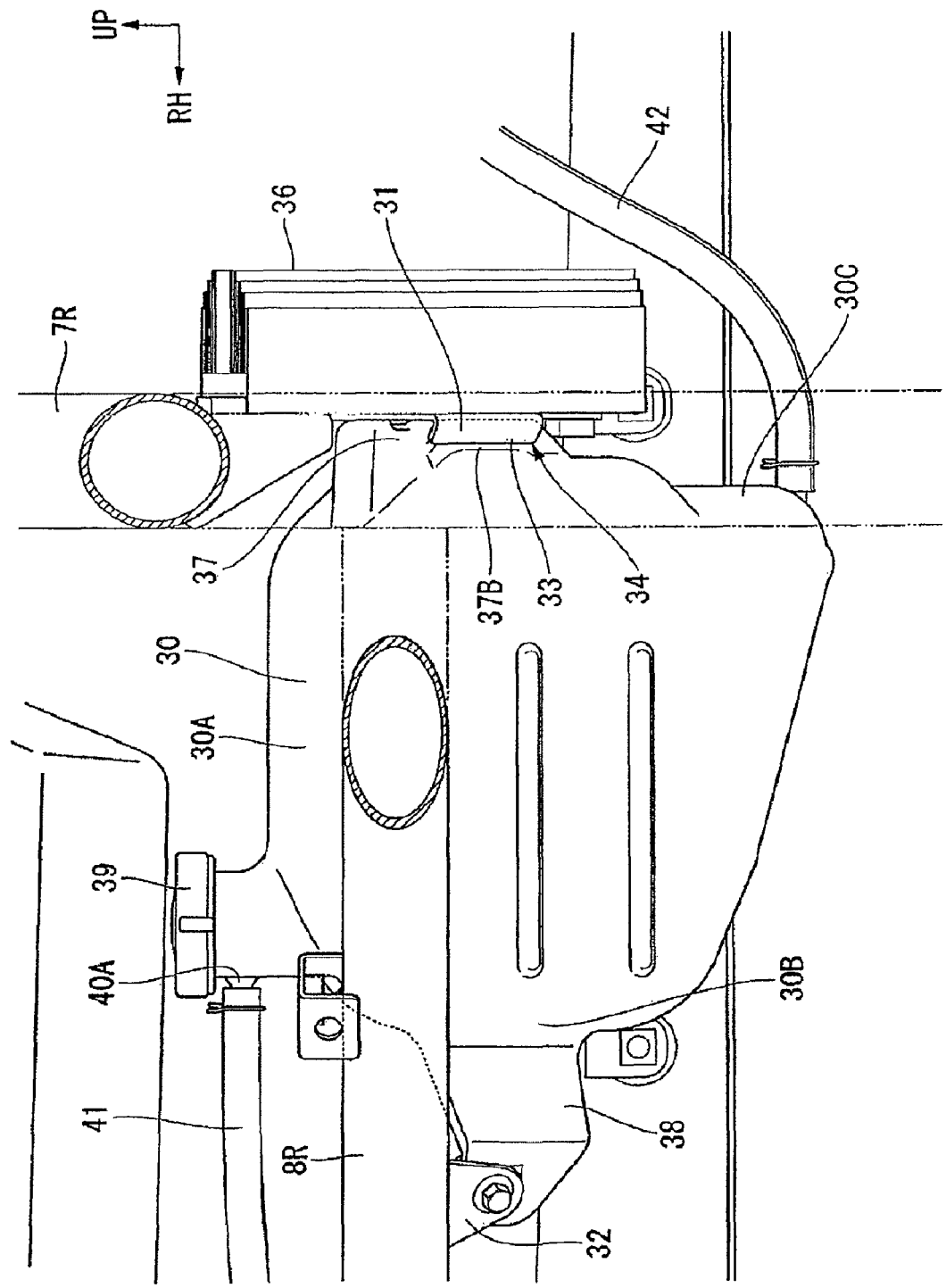
FIG. 6 is a front view of the surrounding of the reservoir.
Figure 7:
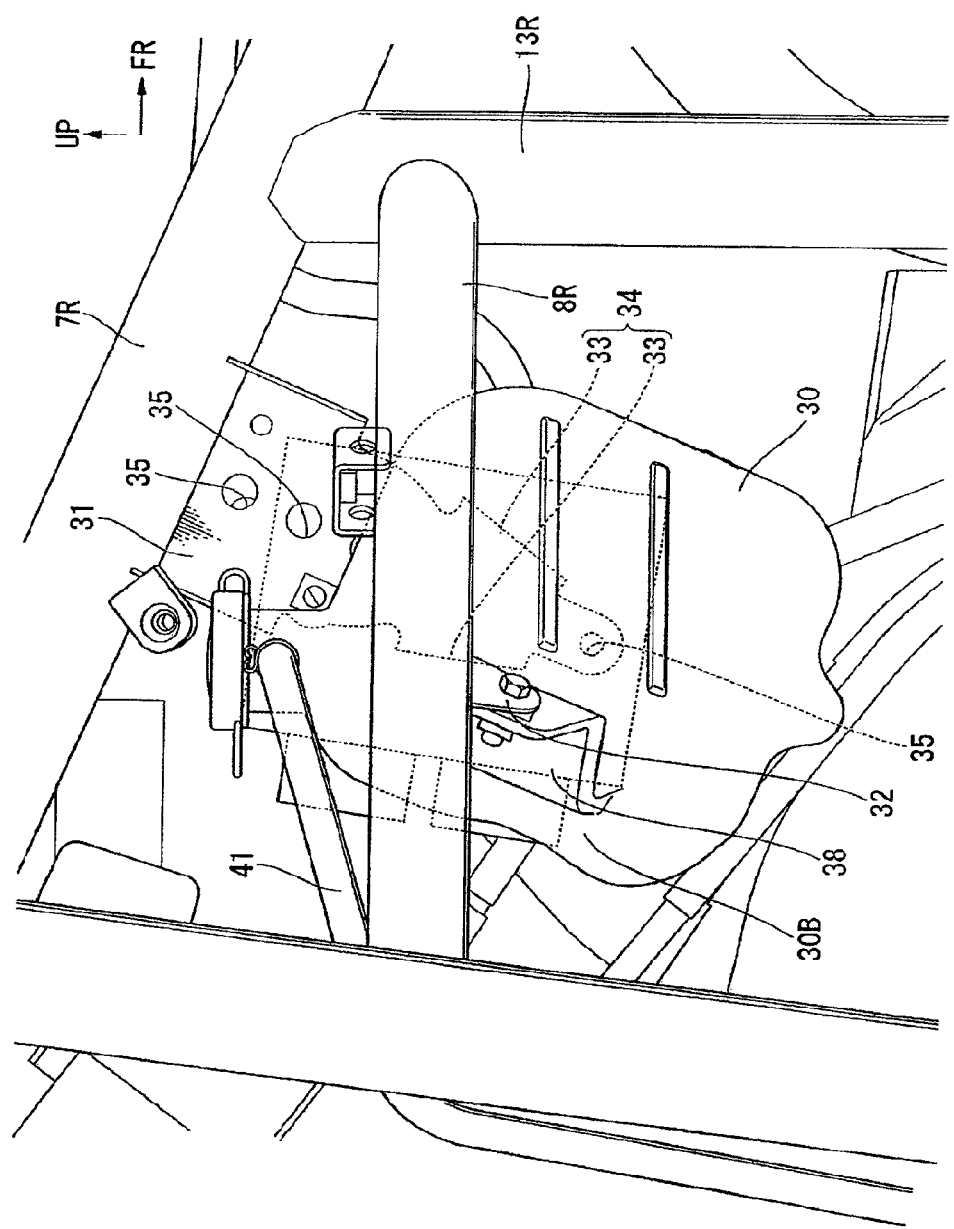
FIG. 7 is a left side view of the surrounding of the reservoir.
Figure 8:
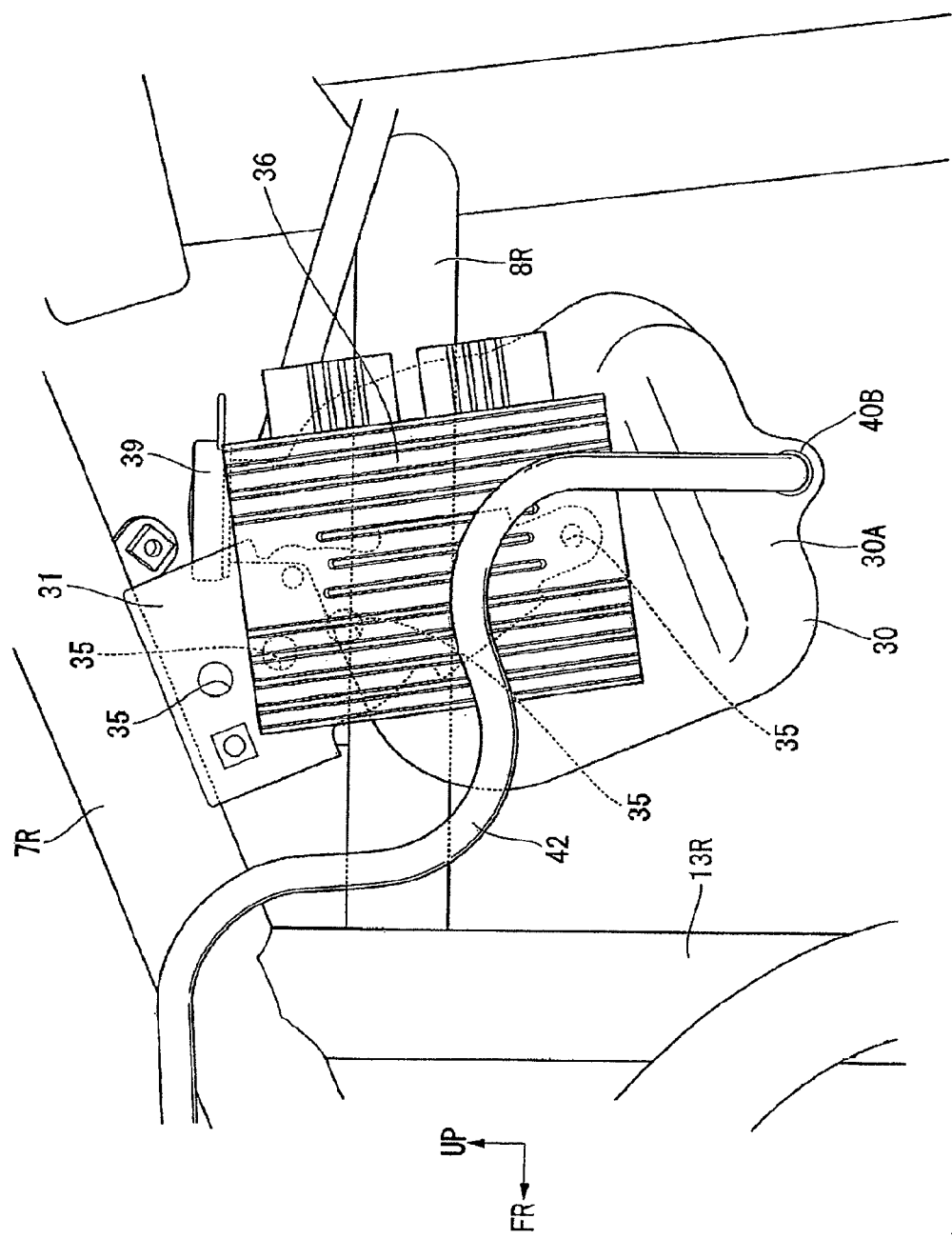
FIG. 8 is a right side view, seen from the vehicle inside, of the surrounding of the reservoir.

As shown in FIGS. 6 to 8, the first bracket 31 is formed from a sheet metal and projects downward from the lower side of the front upper frame 7R, with its base end fixed. The first bracket 31 has its surface arranged in the longitudinal direction. In other words, the first bracket 31 is fixed to the front upper frame 7R in such a way that its surface is aligned with the axial direction of the front propeller shaft 22 and the axial direction of the crankshaft C, as shown in FIG. 3.

As shown in FIG. 6, the first bracket 31 has its both sides folded back outward, and hence it has the folded parts 33 and 33 (only one of them seen from the paper is shown. See also FIG. 7). The folded parts 33 and 33 are formed such that they extend close to the lower end of the first bracket 31 and they get close to each other as they extend downward. The folded parts 33 and 33, combined together, constitute the engaging part 34 that fixes the reservoir 30.

The first bracket 31 has a plurality of through-holes 35 formed therein. As shown in FIG. 8, to one of these through-holes 35 which is at the lowermost position is attached the regulator 36 by means of a bolt and a nut. The regulator 36 is attached to the first bracket 31 in such a way that it is in contact with the surface of the first bracket 31.

Figure 5:
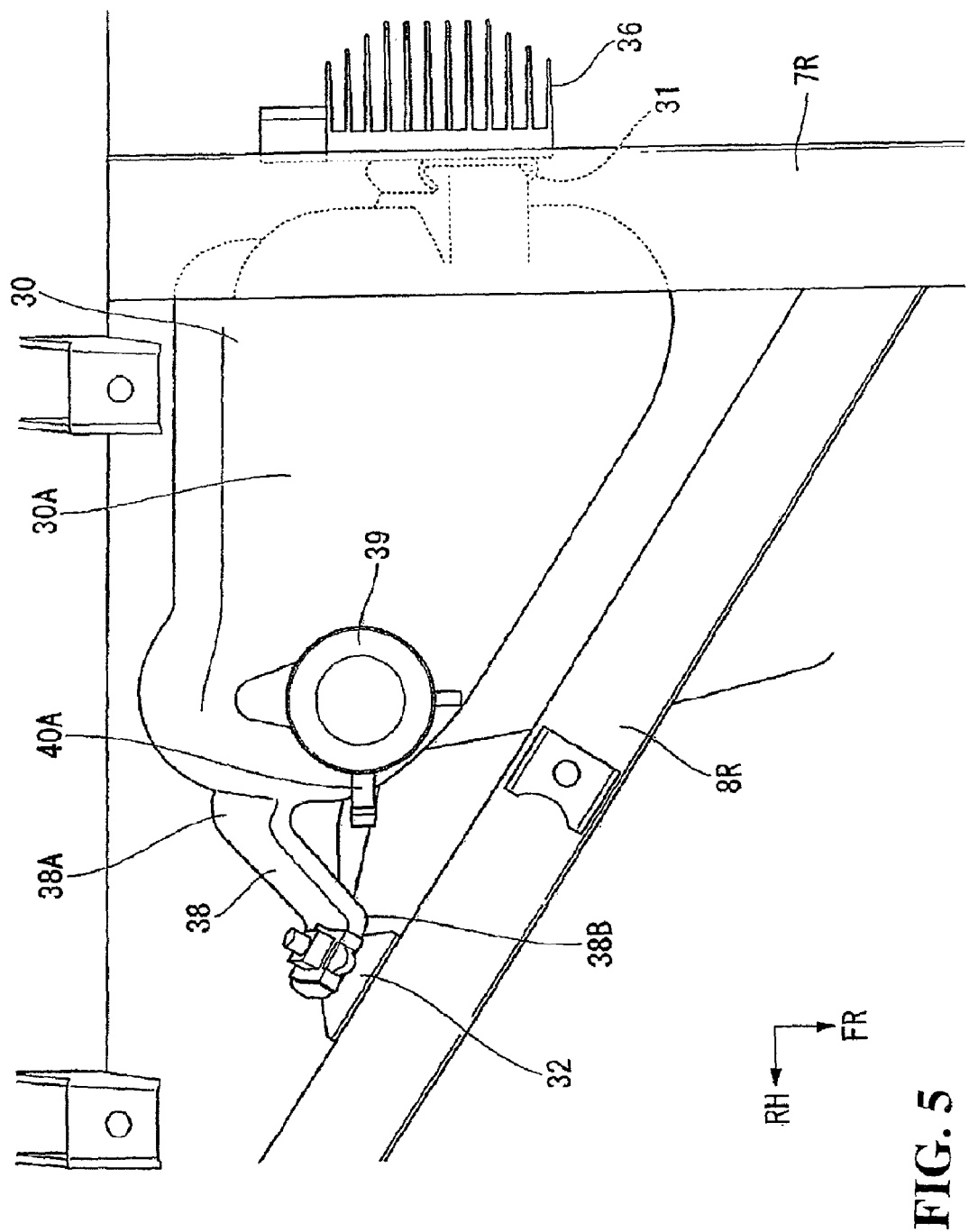
FIG. 5 is a top view of the surrounding of the reservoir.

As shown in FIGS. 5 and 7, the second bracket 32 which is formed from a sheet metal is fixed in such a way that projects downward from the side cross frame 8R. The second bracket 32 has a space formed therein which accommodates and holds a nut. It also has a hole for a bolt to be tightened by the nut to pass through. This hole is not shown.

Figure 9:
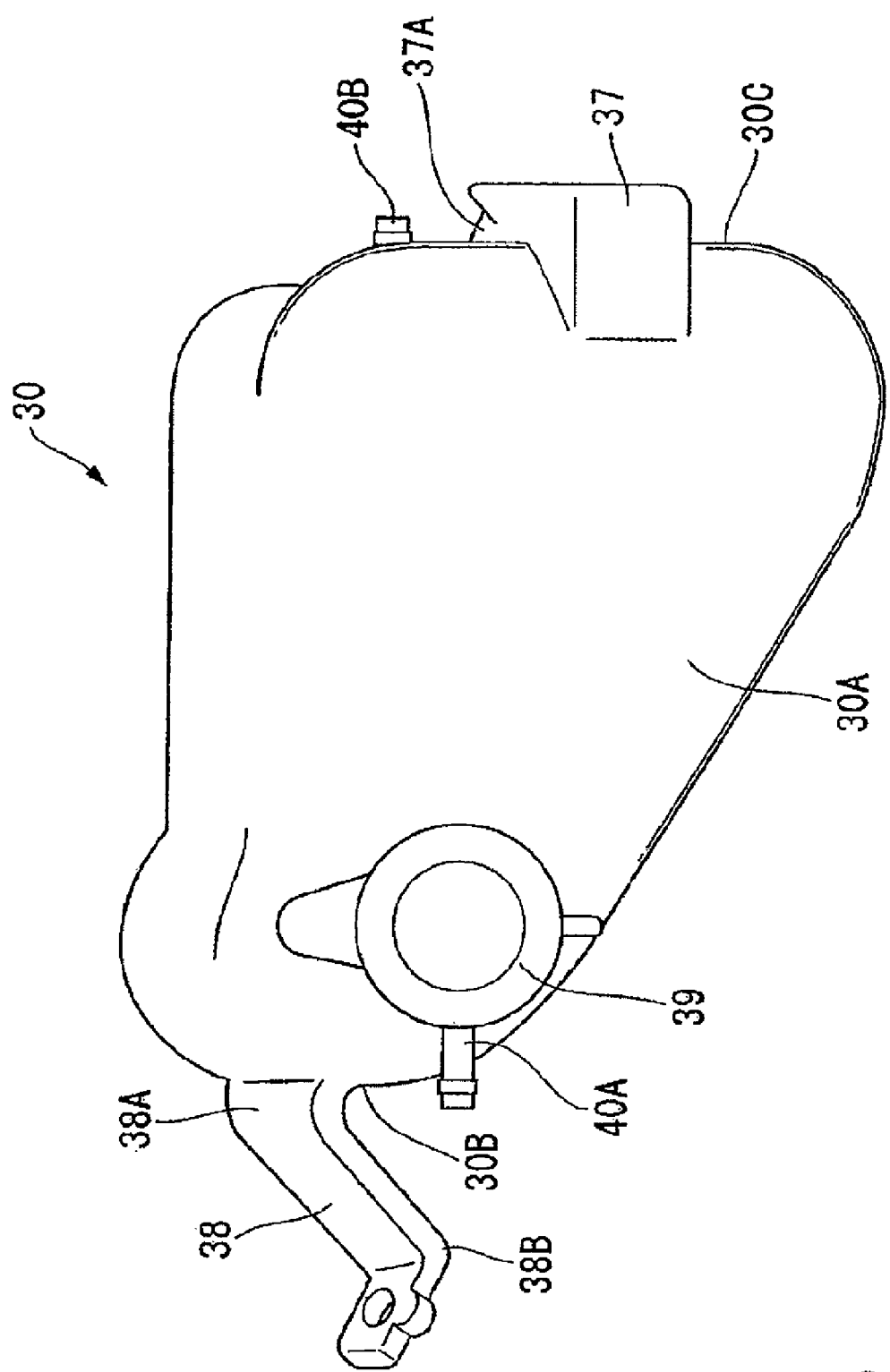
FIG. 9 is a diagram illustrating the reservoir.

FIG. 9 shows the reservoir 30. As shown in FIG. 9, the reservoir 30 has an approximately triangular shape (seen from above). In addition, it has a specific height as specified in FIG. 6, so that it can store as much cooling water as necessary.

The reservoir 30 has the first fixture 37 and the second fixture 38 which are formed integrally therewith. These fixtures are intended to fix the reservoir proper 30A to the first bracket 31 and the second bracket 32. The reservoir proper 30A has the cap 39 which can be opened and closed, on the upper surface thereof. The reservoir proper 30A has the cooling water inlet 40A attached to the lower part of the cap 39. Moreover, the reservoir proper 30A has the cooling water outlet 40B attached to the lower side thereof.

The second fixture 38 is formed at the end 30B of the part extending downward from the apex of the approximately triangular shape (seen from above) of the reservoir proper 30A. To be more specific, it is formed in the approximately central region in the vertical direction of the apex 30B (see FIG. 7). The second fixture 38 is a partly bent sheet that provides elasticity, with the bent portions 38A and 38B forming a crank shape. In addition, the second fixture 38 has a hole for a bolt to pass through at the forward end thereof. This hole is not shown.

On the other hand, the first fixture 37 is formed on the surface 30C opposite to the apex 30B. To be more specific, it is formed in such a way that it extends downward vertically along the surface 30C. The first fixture 37 takes on an approximately triangular shape that tapers downward. Behind the two sides extending downward are formed the grooves 37A and 37B which engage with the folded parts 33 and 33 of the first bracket 31 (see FIGS. 6 and 9).

As shown in FIGS. 4 to 8, the first fixture 37 engages with the engaging part 34 of the first bracket 31. In other words, the folded parts 33 and 33 of the engaging part 34 engage with the grooves 37A and 37B, respectively, and the second fixture 38 bolted to the first bracket 31. Thus, the reservoir 30 is arranged in such a way that it stretches from the front upper frame 7R to the side cross frame 8R. The engaging part 34 of the first bracket 31 extends to the vicinity of the lower end of the first bracket 31, so that the first bracket 31 supports the load of the reservoir 30 mainly by the lower end part. Also, the regulator 36 attached to the first bracket 31 is close to the reservoir 30. The reservoir 30 is heavier than the regulator 36. As illustrated in FIG. 6, a hose 41 extends from the cooling water inlet 40A at the upper part of the reservoir 30 to the engine E. As illustrated in FIG. 6, a hose 42 extends from the cooling water outlet 40B at the lower part of the reservoir 30 to the radiator 28.

According to the foregoing embodiment, one end of the first bracket 31 in plate form is fixed to the body frame 2 and the other end of the first bracket 31 supports the reservoir 30. Moreover, the first bracket 31 supports the regulator 36 in proximity of the reservoir 30. The advantage of this structure is that the reservoir 30 attached to the forward end of the first bracket 31 functions as a deadweight which, because of the inertia of the deadweight, protects the forward end of the first bracket 31 against vibrations due to vehicle traveling and engine rotation. Thus, this simple structure suppresses and attenuates the vibration of the regulator 36 attached to the first bracket 31.

In addition, the cooling water held in the reservoir 30 helps the reservoir 30 keep the position owing to its inertia because the cooling water flows in the reservoir 30. This effectively protects the first bracket 31 and the regulator 36 against vibrations.

Moreover, according to the foregoing embodiment, the reservoir 30 is provided with the first fixture 37 and the second fixture 38 which is elastic, with the first fixture 37 being attached to the first bracket 31 and the second fixture 38 being attached to the second bracket 32 of the side cross frame 8R which is different from the front upper frame 7R to which the first bracket 31 is fixed. In addition, the reservoir 30 is mounted such that it extends across these members. Thus, the reservoir 30 fixed at two positions offers the advantage that the second fixture 38 which is elastic protects the first bracket 31 against vibrations. This in turn effectively protects the first bracket 31 and regulator 36 against vibrations.

In addition, the reservoir 30 is made of plastics and the first and second fixtures 37 and 38 are formed integrally with the reservoir 30. Therefore, the reservoir 30 itself has elastic properties and hence functions as a vibration damper and effectively protects the regulator 36 against vibrations.

Moreover, the second fixture 38 is in the form of sheet and has the folded parts 38A and 38B which take on a crank shape. This simple structure imparts elastic properties to the second fixture 38 and contributes to cost reduction. Also, the reservoir 30 provided with the apex 30B has an approximately triangular shape as viewed from above, and the second fixture 38 is attached to the apex 30B of the triangle of the reservoir 30 and the first fixture 37 is attached to the surface 30C opposite to the apex 30B. Owing to this structure, the surface flexes to absorb vibrations while maintaining the stiffness of the reservoir 30 and hence it effectively suppresses and attenuates the vibration of the first bracket 31 and the regulator 36.

The first bracket 31 has a sheetlike structure and it is fixed to the front upper frame 7R in such a way that its surface is parallel to the axial direction of the front propeller shaft 22 and the axial direction of the crankshaft C. This structure prevents the vehicle vibration in the radial direction of the front propeller shaft 22 caused by the rotation of the front propeller shaft 22 from transmitting to the first bracket 31. Thus, it suppresses the vibrations of the first bracket 31 and the regulator 36.

In addition, the foregoing embodiment merely represents one example of the present invention, and it may be modified and changed in the configuration, structure, size, number, and arrangement of parts within the scope of the present invention.

For instance, the foregoing embodiment (in which the reservoir 30 is fixed to the body frame 2 by the first fixture 37 and the second fixture 38) may be modified such that the reservoir 30 is supported only by the first bracket 31 and hung down from it. In this case, too, the reservoir 30 functions as a deadweight and prevents the forward end of the first bracket 31 from vibration owing to its inertial action. Hence it suppresses and attenuates the vibrations of the regulator 36 attached to the bracket.

Also, the first bracket 31 in the form of sheet may be in the form of rod and the second fixture 38 having the two folded parts 38A and 38B may have more than two folded parts. The foregoing embodiment, in which the ancillaries attached to the first bracket 31 are the reservoir 30 and the regulator 36, may be modified such that they are any other ancillaries.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure for mounting ancillaries on a vehicle to protect against vibrations, said vehicle having a body frame composed of a plurality of frame members, a power generating unit for generating power, and a plurality of ancillaries to assist the operation of the power generating unit, the structure comprising:

a bracket mounted on said body frame, said bracket being formed of a sheet or a rod extending downward, said bracket including a first end and a second end;

wherein the first end of said bracket is fixed to said body frame with a first of said ancillaries being attached to the second end of said bracket and functioning as a deadweight, and a second of said ancillaries is attached to said bracket on an opposite side of said bracket relative to the first of said ancillaries and in proximity of the first of said ancillaries wherein the inertia of the deadweight protects a forward end of the bracket against vibration.

2. The structure for mounting ancillaries on a vehicle as defined in claim 1, wherein said first ancillary is a reservoir to store a liquid therein.

3. The structure for mounting ancillaries on a vehicle as defined in claim 2, wherein said first ancillary has a first fixture and a second fixture having elastic properties, said second fixture is attached to said bracket, said first fixture is attached to a member different from a member to which is attached said bracket of said body frame, and said first ancillary is mounted on said body frame across said different members of the body frame.

4. The structure for mounting ancillaries on a vehicle as defined in claim 3, wherein said first ancillary is a plastic tank and said first fixture and said second fixture are formed integrally with said plastic tank.

5. The structure for mounting ancillaries on a vehicle as defined in claim 2, wherein said bracket is in the form of a sheet and is fixed to said body frame wherein the surface of the sheet is along the axial direction of the driving axle or the axial direction of the crank shaft.

6. The structure for mounting ancillaries on a vehicle as defined in claim 2, wherein said second ancillary is electrical equipment.

7. The structure for mounting ancillaries on a vehicle as defined in claim 1, wherein said first ancillary has a first fixture and a second fixture having elastic properties, said second fixture is attached to said bracket, said first fixture is attached to a member different from a member to which is attached said bracket of said body frame, and said first ancillary is mounted on said body frame across said different members of the body frame.

8. The structure for mounting ancillaries on a vehicle as defined in claim 7, wherein said first ancillary is a plastic tank and said first fixture and said second fixture are formed integrally with said plastic tank.

9. The structure for mounting ancillaries on a vehicle as defined in claim 8, wherein said first fixture is so formed as to have a plurality of folded parts.

10. The structure for mounting ancillaries on a vehicle as defined in claim 8, wherein said first ancillary has an approximately triangular shape having an apex as viewed from above, said first fixture is formed at said apex of said first ancillary, and said first ancillary is formed at the surface opposite to said apex.

11. The structure for mounting ancillaries on a vehicle as defined in claim 8, wherein said bracket is in the form of a sheet and is fixed to said body frame wherein the surface of the sheet is along the axial direction of the driving axle or the axial direction of the crank shaft.

12. The structure for mounting ancillaries on a vehicle as defined in claim 7, wherein said first fixture is so formed as to have a plurality of folded parts.

13. The structure for mounting ancillaries on a vehicle as defined in claim 12, wherein said first ancillary has an approximately triangular shape having an apex as viewed from above, said second fixture is formed at said apex of said first ancillary, and said first ancillary is formed at the surface opposite to said apex.

14. The structure for mounting ancillaries on a vehicle as defined in claim 12, wherein said bracket is in the form of a sheet and is fixed to said body frame wherein the surface of the sheet is along the axial direction of the driving axle or the axial direction of the crank shaft.

15. The structure for mounting ancillaries on a vehicle as defined in claim 7, wherein said first ancillary has an approximately triangular shape having an apex as viewed from above, said first fixture is formed at said apex of said first ancillary, and said first ancillary is formed at the surface opposite to said apex.

16. The structure for mounting ancillaries on a vehicle as defined in claim 15, wherein said bracket is in the form of a sheet and is fixed to said body frame wherein the surface of the sheet is along the axial direction of the driving axle or the axial direction of the crank shaft.

17. The structure for mounting ancillaries on a vehicle as defined in claim 7, wherein said bracket is in the form of a sheet and is fixed to said body frame wherein the surface of the sheet is along the axial direction of the driving axle or the axial direction of the crank shaft.

18. The structure for mounting ancillaries on a vehicle as defined in claim 1, wherein said bracket is in the form of a sheet and is fixed to said body frame wherein the surface of the sheet is along the axial direction of the driving axle or the axial direction of the crank shaft.

19. The structure for mounting ancillaries on a vehicle as defined in claim 1, wherein said second ancillary is electrical equipment.

20. The structure for mounting ancillaries on a vehicle as defined in claim 1, wherein said first ancillary is one which is heavier than said second ancillary.

* * * * *